United States Patent
D'Accorso et al.

(10) Patent No.: US 11,998,877 B2
(45) Date of Patent: Jun. 4, 2024

(54) METHOD OF PREPARATION OF NEW SUPER-HYDROPHOBIC MEMBRANES AND MEMBRANES OBTAINED BY SAID METHOD

(71) Applicants: YPF TECNOLOGÍA S.A., Ciudad Autónoma de Buenos Aires (AR); CONSEJO NACIONAL DE INVESTIGACIONES CIENTÍFICAS Y TÉCNICAS (CONICET), Ciudad Autónoma de Buenos Aires (AR)

(72) Inventors: Norma Beatriz D'Accorso, Buenos Aires Buenos Aires (AR); Mariana Sosa, Lanús, Pcia. de Buenos Aires (AR); Ricardo Martin Negri, Ciudad Autónoma de Buenos Aires (AR); Graciela Rojas, Berisso, Pcia. de Buenos Aires (AR); María Elena Oneto, La Plata, Pcia. de Buenos Aires (AR); Gabriel Lombardo, Ituzangó, Prov. de Buenos Aires (AR)

(73) Assignees: YPF TECNOLOGIA S.A., Ciudad Autónoma de Buenos Aires (AR); CONSEJO NACIONAL DE INVESTIGACIONES CIENTÍFICAS Y TÉCNICAS (CONICET), Ciudad Autónoma de Buenos Aires (AR)

(*) Notice: Subject to any disclaimer, the term of this patent is extended or adjusted under 35 U.S.C. 154(b) by 855 days.

(21) Appl. No.: 16/969,128

(22) PCT Filed: Feb. 12, 2019

(86) PCT No.: PCT/IB2019/051127
§ 371 (c)(1),
(2) Date: Aug. 11, 2020

(87) PCT Pub. No.: WO2019/155446
PCT Pub. Date: Aug. 15, 2019

(65) Prior Publication Data
US 2021/0039049 A1    Feb. 11, 2021

Related U.S. Application Data

(60) Provisional application No. 62/786,250, filed on Dec. 28, 2018, provisional application No. 62/629,366, filed on Feb. 12, 2018.

(51) Int. Cl.
*B01D 67/00* (2006.01)
*B01D 17/04* (2006.01)
(Continued)

(52) U.S. Cl.
CPC ....... *B01D 67/0069* (2013.01); *B01D 17/045* (2013.01); *B01D 67/0006* (2013.01);
(Continued)

(58) Field of Classification Search
CPC .... B01D 69/10; B01D 69/105; B01D 69/108; B01D 67/0069; B01D 67/0079; C25D 11/02–34
See application file for complete search history.

(56) References Cited

U.S. PATENT DOCUMENTS

2011/0147219 A1* 6/2011 Lambourne ............. F01D 5/288
205/200
2014/0182790 A1* 7/2014 Hwang .................. F28F 19/00
205/109

(Continued)

FOREIGN PATENT DOCUMENTS

CA      2985244 A1    5/2018
CN    105056770 A    11/2015
(Continued)

OTHER PUBLICATIONS

Attractive Forces between Hydrophobic Solid Surfaces Measured by AFM on the First Approach in Salt Solutions and in the Presence of Dissolved Gases Mehdi Azadi, Anh V. Nguyen, and Gleb E. Yakubov Langmuir 2015 31 (6), 1941-1949 (Year: 2015).*

*Primary Examiner* — Alex A Rolland
(74) *Attorney, Agent, or Firm* — Muncy, Geissler, Olds & Lowe, P.C.

(57) ABSTRACT

A method for preparing a super-hydrophobic membrane by cleaning a metal mesh by immersion in an organic solvent; subjecting the cleaned metal mesh to a surface modification treatment to increase its hydrophilicity; coating the treated (Continued)

metal mesh with a hydrophobic organic substance; and drying the metal coated mesh for obtaining the super-hydrophobic membrane. The super-hydrophobic membrane obtained thereby.

6 Claims, 10 Drawing Sheets

(51) Int. Cl.
    *B01D 69/02*     (2006.01)
    *B01D 69/10*     (2006.01)
    *B01D 71/34*     (2006.01)
    *B01D 71/70*     (2006.01)
    *B05D 5/08*     (2006.01)
    *C25D 11/34*     (2006.01)

(52) U.S. Cl.
    CPC ... *B01D 67/00791* (2022.08); *B01D 67/0095* (2013.01); *B01D 69/02* (2013.01); *B01D 69/105* (2013.01); *B01D 71/34* (2013.01); *B01D 71/701* (2022.08); *B05D 5/08* (2013.01); *B01D 2323/04* (2013.01); *B01D 2323/08* (2013.01); *B01D 2323/10* (2013.01); *B01D 2325/38* (2013.01); *C25D 11/34* (2013.01)

(56) References Cited

U.S. PATENT DOCUMENTS

2015/0353385 A1* 12/2015 Wang .................. C02F 1/10
                                                                             427/244
2016/0222143 A1     8/2016   Goyanes et al.

FOREIGN PATENT DOCUMENTS

| CN | 106422423 A | 2/2017 |
|----|-------------|--------|
| CN | 107349803 A | 11/2017 |
| WO | WO-2015/189705 A1 | 12/2015 |

\* cited by examiner

Electrochemical Anodizing

Nanostructuring with SiO₂

Sililating with HDTMS

Electrochemical Anodizing

Nanostructuring with SiO₂

Sililating with octanol

METHOD OF PREPARATION OF NEW SUPER-HYDROPHOBIC MEMBRANES AND MEMBRANES OBTAINED BY SAID METHOD

FIELD OF THE INVENTION

The present invention refers to super-hydrophobic membranes for oil/water separation featuring improved characteristics, both in resistance to aggressive media, such as hard water, as well as in super-hydrophobicity properties and to methods of preparation thereof. In some embodiments, the obtained super-hydrophobic membranes present contact angles higher than 160°.

BACKGROUND OF THE INVENTION

Membrane separation processes are widely used in the treatment of oily wastewater, due to the high separation efficiency and their relatively easy operation and control.

Separation efficiency is closely related to the hydrophobic characteristics of the metal surfaces. In particular, the wettability of the membrane surface, measured by the water contact angle, determines the overall separation performance. A contact angle greater than 150° is typical of a surface presenting super-hydrophobicity.

US 2016/222143 A1 describes a selective absorption membrane for hydrocarbons, mineral, animal or vegetable oils comprising a nanoporous material, with a water contact angle of approximately 130°.

CN 105056770 A describes a super-hydrophilic and underwater super-oleophobic oil-water separation membrane with chemical resistance, obtained by a preparation method based in UV curing. In some embodiments, membranes with contact angles of approximately 150° are described.

There is therefore a need to provide membranes with improved super-hydrophobicity properties, that will result in more efficient oil/water separation processes.

BRIEF DESCRIPTION OF THE INVENTION

In a first aspect, the present invention relates to a method of preparation of super-hydrophobic membranes for separation of organic substances, such as for example hydrocarbons, from aqueous phases.

It is therefore an object of the present application a method for preparing a super-hydrophobic membrane comprising the steps of:
 a) providing a metal mesh;
 b) cleaning the metal mesh by immersion in an organic solvent, preferably acetone;
 c) subjecting the metal mesh cleaned in step b) to a surface modification treatment to increase its hydrophilicity;
 d) coating the metal mesh treated in step c) with a hydrophobic organic substance;
 e) drying the metal mesh treated in step d) in order to obtain the super-hydrophobic membrane.

In an embodiment of the invention, the surface modification treatment of step c) comprises an electrochemical anodizing process. Preferably, said electrochemical anodizing process is carried out in an aqueous NaOH solution. More preferably, said electrochemical anodizing process is carried out with copper counter electrodes and with a surface current density of approximately $0.17 \, A/cm^2$. Preferably, the mesh is dried in a stove after this electrochemical anodizing process.

In another embodiment of the invention, the surface modification treatment of step c) comprises a chemical oxidation with mineral acid, preferably hydrochloric acid.

In another embodiment of the invention, the method further includes a step c') prior to step d) wherein the metal mesh is subjected to a treatment step with a suspension of nanoparticulated oxides. Preferably, these nanoparticulated oxides are selected from $SiO_2$, $TiO_2$ and combinations thereof.

In an embodiment of the invention, the metal mesh is a mesh of an alloy selected from the group comprising brass, bronze, tin bronze or stainless steel.

In an embodiment of the invention, in step d) the mesh is coated by immersion in a solution of a hydrophobic silylated reagent. Preferably, the hydrophobic silylated reagent is selected from the group comprising hexadecyltrimethoxysilane (HDTMS), octadecyltrimethoxysilane, and their respective ethoxylated derivates and silanols, in a mixture of ethanol and glacial acetic acid.

In another embodiment of the invention, in step d) the mesh is coated by immersion in long chain alcohols at approximately boiling temperature. Preferably, the long chain alcohols are selected from the group comprising octanol, decanol, dodecanol, hexadecanol, halogenated alcohols.

In an embodiment of the invention, in step d) the mesh is coated by immersion in a solution comprising fluorinated polymers, silicones or combinations thereof, preferably polyvinylidene (PVDF), fluorinated ethylene propylene (FEP) and polytetrafluoroethylene (PTFE).

In another embodiment of the invention, the solution comprising fluorinated polymers, silicones or combinations thereof also comprises nanoparticulated oxides. The step of treatment with a suspension of nanoparticulated oxides is carried out simultaneously with step c).

In an embodiment of the invention, in step e) the mesh treated in step d) is dried at a temperature in the range between 90° C. and 210° C., preferably 110° C.

In an embodiment of the invention, in step e) the mesh treated in step d) is dried at a pressure in the range between 5 and 40 mmHg.

In a second aspect, the present invention refers to a super-hydrophobic membrane that presents a contact angle in the range between 150° and 170°, preferably between 158° and 162° and more preferably approximately 162°.

In a third aspect, the present invention refers to a super-hydrophobic membrane comprising:
 a superficially treated metal mesh; and
 a hydrophobic coating.

In embodiments of this third aspect of the invention, the metal mesh is superficially treated by a chemical oxidation with a mineral acid, preferably hydrochloric acid, or by an electrochemical anodizing process.

In embodiments of this third aspect of the invention, the hydrophobic coating is selected from the group comprising:
 a hydrophobic silylated agent, preferably selected from the group comprising hexadecyltrimethoxysilane (HDTMS), octadecyltrimethoxysilane, and their respective ethoxylated derivates and silanols,
 long chain alcohols, preferably octanol, decanol, dodecanol, hexadecanol, halogenated alcohols; and fluorinated polymers, silicones or combinations thereof, preferably polyvinylidene (PVDF), fluorinated ethylene propylene (FEP) and polytetrafluoroethylene (PTFE).

In embodiments of this third aspect of the invention, the membrane further comprises nanoparticulated oxides, preferably $SiO_2$, $TiO_2$ or combinations thereof.

BRIEF DESCRIPTION OF THE FIGURES

FIG. 2B shows a magnification where the surface nanostructure can be observed.

FIG. 4B shows a magnification where the surface nanostructure can be observed.

DETAILED DESCRIPTION OF THE INVENTION

Figure 1:
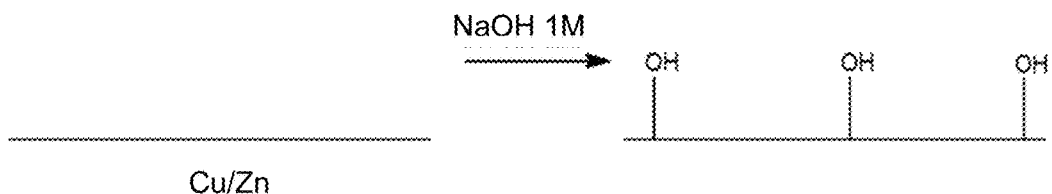
FIG. 1 shows the reactions associated with the different steps of treatment of the metal meshes treated with HDTMS.
Figure 1:
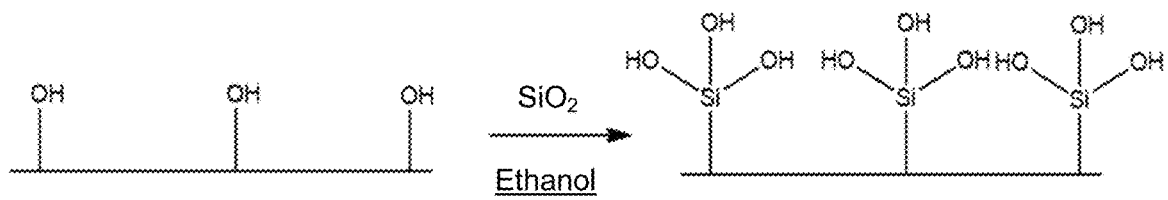
Figure 1:
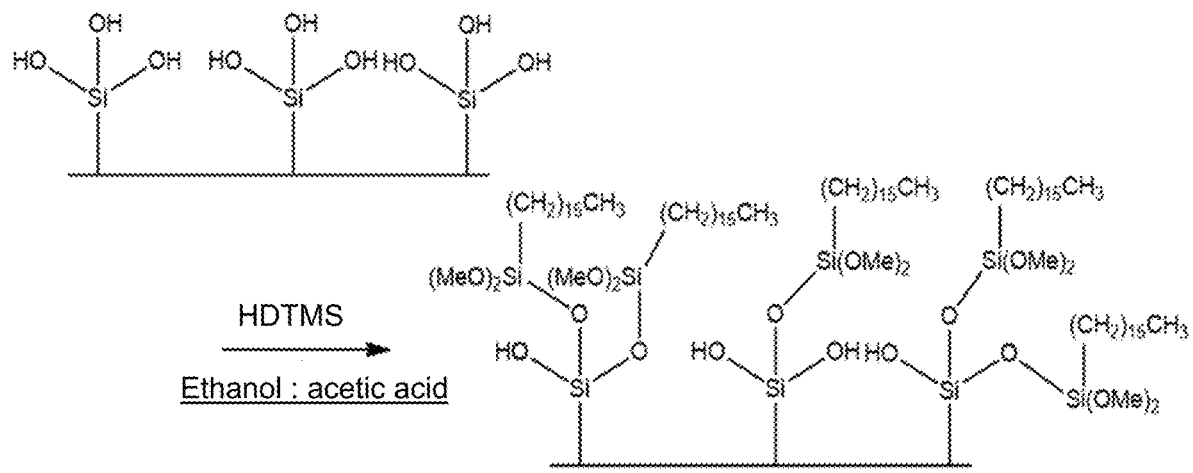

The application will be described in detail with reference to the accompanying figures.

As used herein, the given numerical ranges of variables or physical quantities are intended to comprise the end values of the range as well as any intermediate values.

The term "approximately" indicates that a given variable or physical quantity may be within a range of +/−10% of the given numerical value.

The terms "oil", "oil phase", "organic phase" and equivalents are used in the present application indistinctly in order to indicate any hydrocarbon phase to be separated from a mixture with an aqueous phase.

The methods for preparing super-hydrophobic membranes will be described as follows and will be illustrated by means of non-limiting examples.

In general, the method comprises a step wherein a metal mesh is pre-treated by cleaning using an organic solvent, followed by a step wherein a surface modification treatment of the cleaned metal mesh surface is carried out.

This surface modification step can be carried out by reaction of a metal surface with mineral acids, or by way of electrolysis, as explained in further detail below.

The method by way of electrolysis is carried out by a first step of anodizing the metal surface. The anodizing process can be carried out, for example, by using an electronic source providing constant electrical current, the positive terminal of said source being in electrical contact with said metal surface while, simultaneously, the negative terminal of this source is in electrical contact with another metal surface, being the cathode. The metal surface to be treated and the cathode are immersed in an aqueous solution comprising an electrolyte, i.e. an electrolytic solution. The electrolytic solution must have dissolved salts therein, in order to provide the necessary electrical conductivity. The passage of electric current is carried out during a determined amount of time, necessary to provide the surface with sufficient adsorption sites for a subsequent deposit of organic substances.

To increase hydrophilicity, the metal surface can be treated with nanoparticulated oxides before the deposition of an organic substance, such as for example long chain alcohols, silanes, fluorinated polymers, silicones, etc.

In some embodiments, inorganic oxide nanoparticles are adsorbed onto the surface as an intermediate step prior to the deposition of organic substances.

The deposition or coating of organic substances onto the metal surface can be carried out by immersion of the metal surface in solvent solutions comprising the organic substance to be deposited, followed by subsequent solvent removal by evaporation. In some cases, reflux conditions are required. Preparation times must be adjusted depending on the experimental conditions and chemical species, as will be illustrated herein.

Surprisingly, the inventors have found that including a step of superficial modification of the metal meshes in the preparation method leads to membranes with improved super-hydrophobicity characteristics with respect to those of the prior art. These characteristics were also found to be stable over time.

In addition, the method of preparation does not require the use of chemical binders to obtain such improved properties.

EXAMPLES

Example 1—HDTMS Membrane

Tin bronze meshes #200 (77 μm) were cleaned with acetone under sonication and then dried at room temperature. Subsequently, the cleaned meshes were subjected to an electrochemical anodizing process by immersion in an aqueous NaOH solution at 1 mol/L using copper counter electrodes, and with a surface current density of 0.17 A/cm$^2$, with subsequent drying at 120° C. in a stove for ten minutes. During this step, the hydrophilic sites required for the next nanostructuring step are generated on the metal surface.

The anodized meshes were then immersed in a nanoparticle suspension with 20 mg $SiO_2$ for every 1 mL of ethanol, under agitation for one hour, and then dried in a stove at 110° C. for one hour. In this step, the meshes multiply the number of hydroxyl groups capable of reacting with the hydrophobic reagent in subsequent steps of the method and acquire the required nanostructure for the desired hydrophobicity.

Lastly, the already nanostructured meshes were treated with hexadecyltrimethoxysilane (HDTMS) by immersion in a solution with 40 μL of HDTMS for every 1 mL in a 95:5 ethanol:acetic acid mixture for one hour, and dried in an oven at 110° C. for one hour. During this step, the meshes acquire super-hydrophobicity, repelling water. This behavior was characterized by measuring the contact angle using conventional contact angle determination techniques, obtaining contact angles of approximately 162°, as shown in Table 1.

Figure 2A:
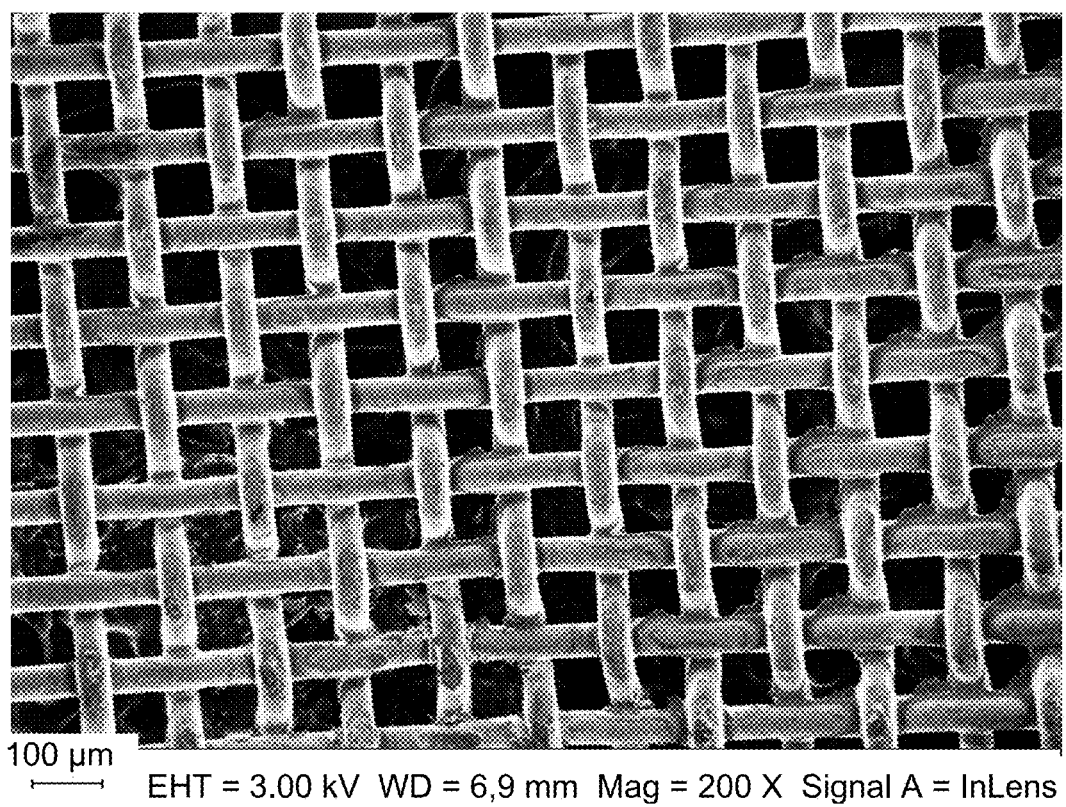
FIGS. 2A-2B show scanning electronic microscopy (SEM) images of the silylated mesh.
Figure 2B:
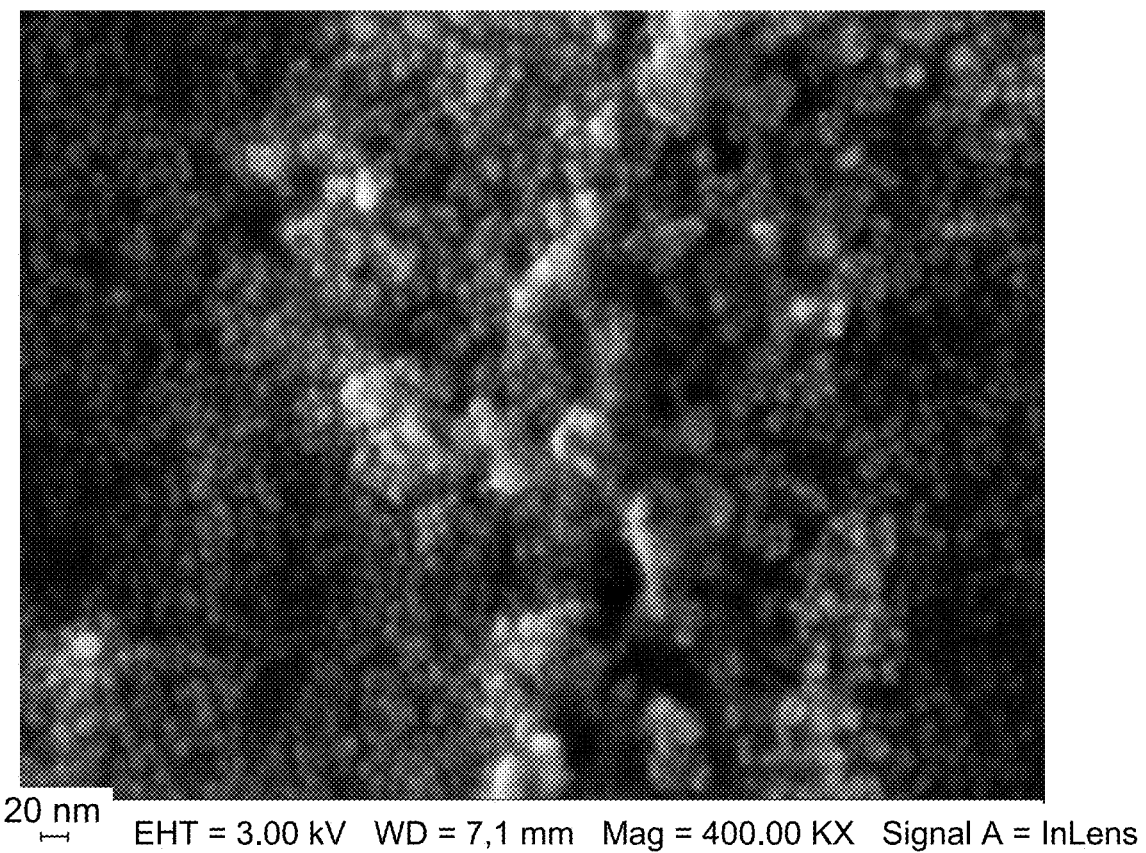

FIG. 1 shows a schematic diagram of the method of preparation of this exemplary embodiment. FIGS. 2A-2B show SEM images of the mesh treated with this method of the present invention.

The obtained mesh has resistance to hostile conditions, such as resistance to water comprising monovalent and divalent ions in concentrations higher than 2000 ppm, and it may be used in at least three separation cycles of an oil/water mixture, always observing the same contact angle thereafter.

Hexadecyltrimethoxysilane, octadecyltrimethoxysilane and their respective ethoxylated derivatives and silanols were employed as sililant reagents, obtaining in every case membranes with super-hydrophobic properties, determined by their contact angle.

Example 2—Octanol Membrane

Tin bronze meshes #200 (77 μm) were cleaned with acetone under sonication and then dried at room temperature. Subsequently, the cleaned meshes were subjected to an electrochemical anodizing process by immersion in an aqueous NaOH solution at 1 mol/L using copper counter electrodes, and with a surface current density of 0.17 A/cm$^2$, with subsequent drying at 120° C. in a stove for ten minutes. During this step, the hydrophilic sites required for the next nanostructuring step are generated on the metal surface.

The anodized meshes were then immersed in a nanoparticle suspension with 20 mg $SiO_2$ for every 1 mL of ethanol, under agitation for one hour, and then dried in a stove at 110° C. for one hour. In this step, the meshes multiply the number of hydroxyl groups capable of reacting with the hydrophobic reagent in subsequent steps of the method and acquire the required nanostructure for the desired hydrophobicity.

In a final step, the already nanostructured meshes were immersed in octanol at 180° C. for three hours under reflux, and subsequently dried at a pressure of 20 mmHg at 110° C. for one hour. The resulting meshes show super-hydrophobicity, where contact angles of approximately 158° were determined, as shown in Table 1.

Figure 3:
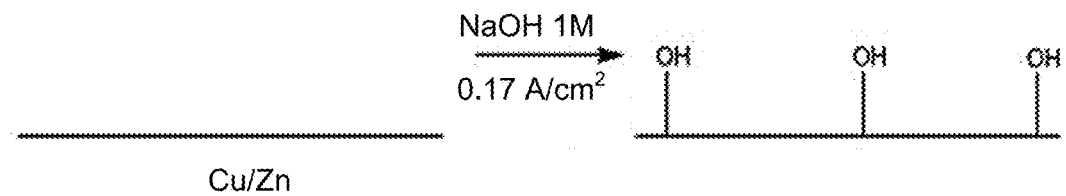
FIG. 3 shows the reactions associated with the different steps of treatment of the metal meshes treated with octanol.
Figure 3:
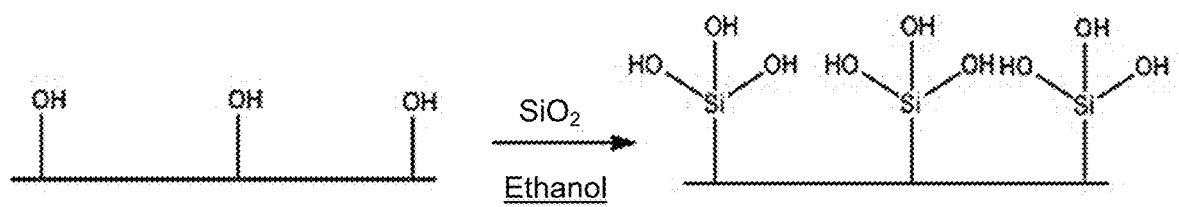
Figure 3:
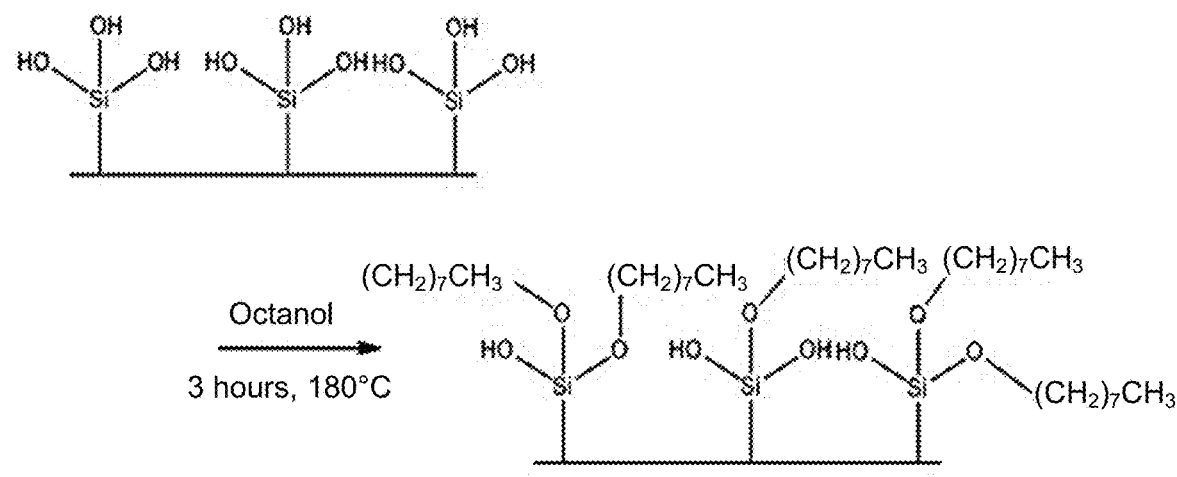
Figure 4A:
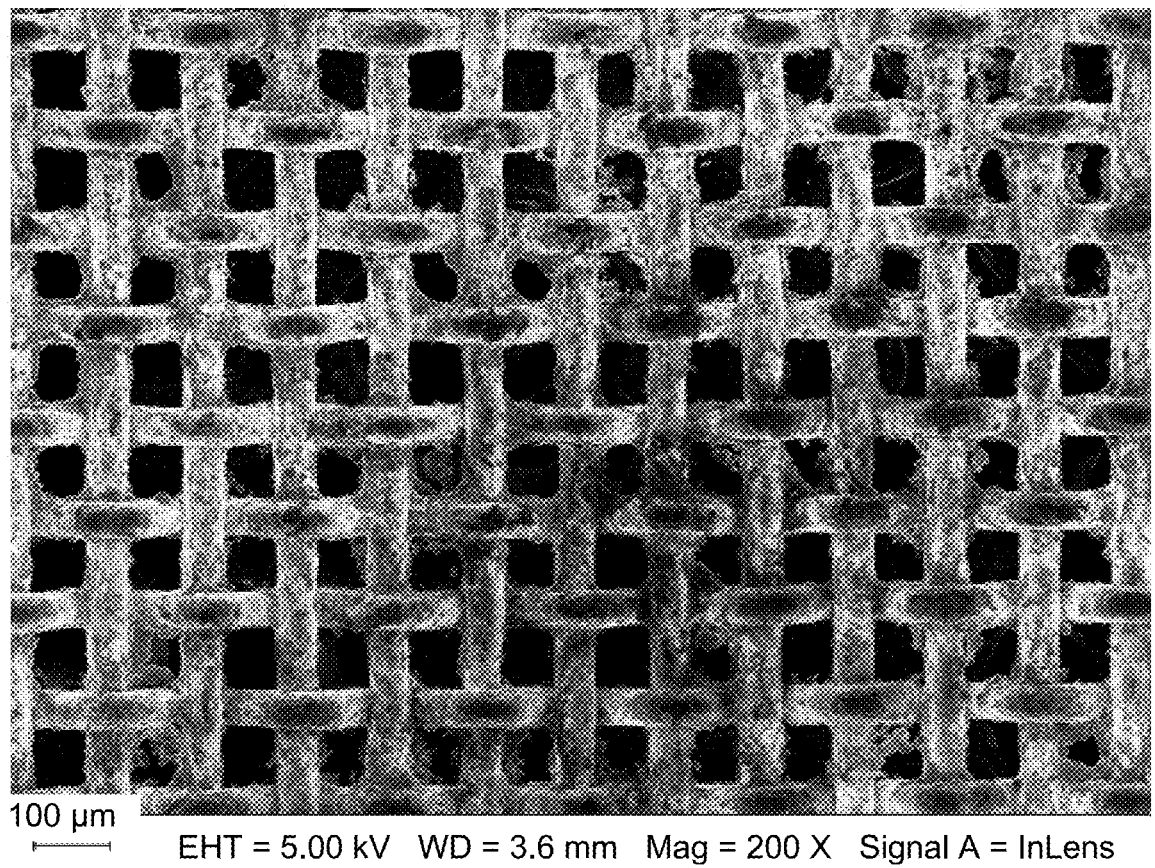
FIGS. 4A-4B show SEM images of the mesh treated with octanol.
Figure 4B:
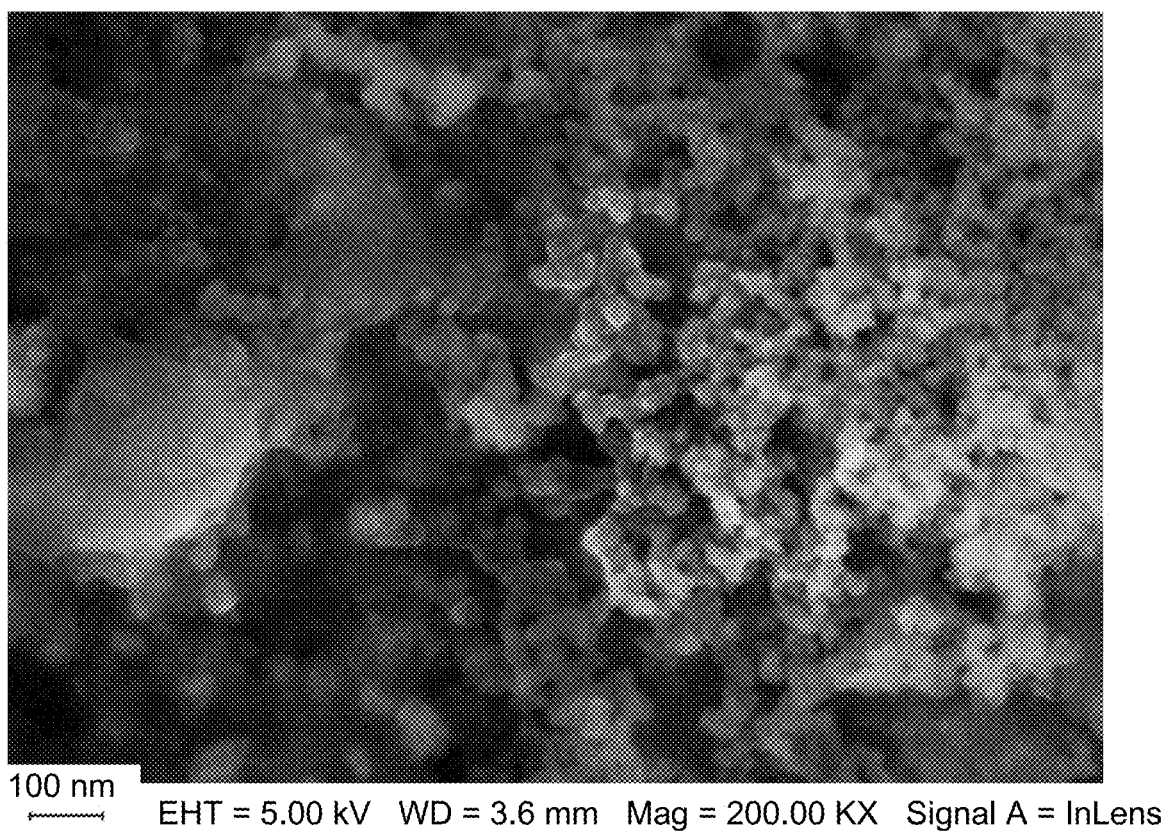

FIG. 3 shows a schematic diagram of the method of preparation of this exemplary embodiment. FIGS. 4A-4B show SEM images of the mesh treated with this method of the present invention.

The obtained mesh has resistance to hostile conditions, such as resistance to water comprising monovalent and divalent ions in concentrations higher than 2000 ppm, and it may be used in at least three separation cycles of an oil/water mixture, observing the same contact angle thereafter.

Octanol, decanol, dodecanol, hexadecanol, and perfluorooctanol were used as hydrophobic alcohols, obtaining in every case membranes with super-hydrophobic properties, as determined by their contact angle.

Example 3—PVDF-PDMS-NPs Membrane

A 300 μm pore size brass mesh was employed. A mixture of polyvinylidene fluoride (PVDF) and $SiO_2$ nanoparticles (NPs) in acetone was prepared, employing the following proportions: 0.3 g of PVDF and 0.3 g of nanoparticles were used for every 5 mL of acetone (Mixture 1).

On the other hand, another mixture was prepared with the following proportions: 0.3 g of polydimethylsiloxane base polymer (PDMS) and 0.03 g of crosslinking agent were used for every 2 mL of toluene, i.e. a ratio PDMS:crosslinking agent (m/m) of 10:1 (Mixture 2).

Mixture 1 was sonicated for 15 minutes; the time can be varied until it is observed that the particles and the polymer are correctly dispersed.

The meshes were cleaned with acetone under sonication and then dried at room temperature. Subsequently, they were subjected to an electrochemical anodizing process by immersion in an aqueous 1M NaOH solution using copper counter electrodes, and with a surface current density of 0.17 A/cm$^2$, with subsequent drying at 120° C. in a stove for ten minutes. During this step, the hydrophilic sites required for the next nanostructuring step are generated on the metal surface.

The mesh was immersed for 30 seconds in Mixture 1. The mesh was then dried at room temperature. Optionally, the mesh can be dried at moderate temperature in the stove. Subsequently, the mesh was immersed in Mixture 2 for 30 seconds. The obtained membrane was placed in the stove at 200° C. for 2 hours.

When assessing hydrophobicity, a contact angle of approximately 158° was obtained, as shown in Table 1.

The concentrations of the reagents used for the preparation of Mixture 1 were varied between the following PVDF/NPs ratios (m/m): 1, 2 and 0.5, obtaining in every case membranes with super-hydrophobic properties, determined by the contact angle.

The mesh immersion times in Mixtures 1 and 2 were varied in the range between 30 and 60 seconds, obtaining in every case membranes with super-hydrophobicity properties, determined by the contact angle.

The obtained mesh has resistance to hostile conditions, such as resistance to water comprising monovalent and divalent ions in concentrations higher than 2000 ppm, and it may be used in at least three separation cycles of an oil/water mixture, always observing the same contact angle thereafter.

Polyvinylidene fluoride (PVDF), fluorinated ethylene propylene (FEP) and polytetrafluoroethylene (PTFE) were used as fluorinated polymers, obtaining in every case membranes with super-hydrophobic properties, determined by their contact angle.

Example 4—PVDF-PDMS-NPs Membrane

A 300 μm pore size brass mesh was employed. A mixture of PVDF and $SiO_2$ nanoparticles (NPs), silicone in toluene was prepared, employing the following proportions: 1 g of PVDF and 1 g of NPs, 1 g PDMS and 0.1 g crosslinking agent were used for every 7 mL of toluene.

The mixture was sonicated for 15 minutes, the time can be varied until it is observed that the particles and the polymer are correctly dispersed.

The meshes were cleaned with acetone under sonication and then dried at room temperature. Subsequently, they were subjected to an electrochemical anodizing process by immersion in an aqueous 1 M NaOH solution using copper counter electrodes, and with a surface current density of 0.17 A/cm$^2$, with subsequent drying at 120° C. in a stove for ten minutes. During this step, the hydrophilic sites required for the next nanostructuring step are generated on the metal surface.

Subsequently, the mesh was immersed in the mixture for 30 seconds. The obtained membrane was placed in the stove at 200° C. for 2 hours.

For this system, a contact angle of approximately 158° was also obtained, as shown in Table 1.

Figure 6:
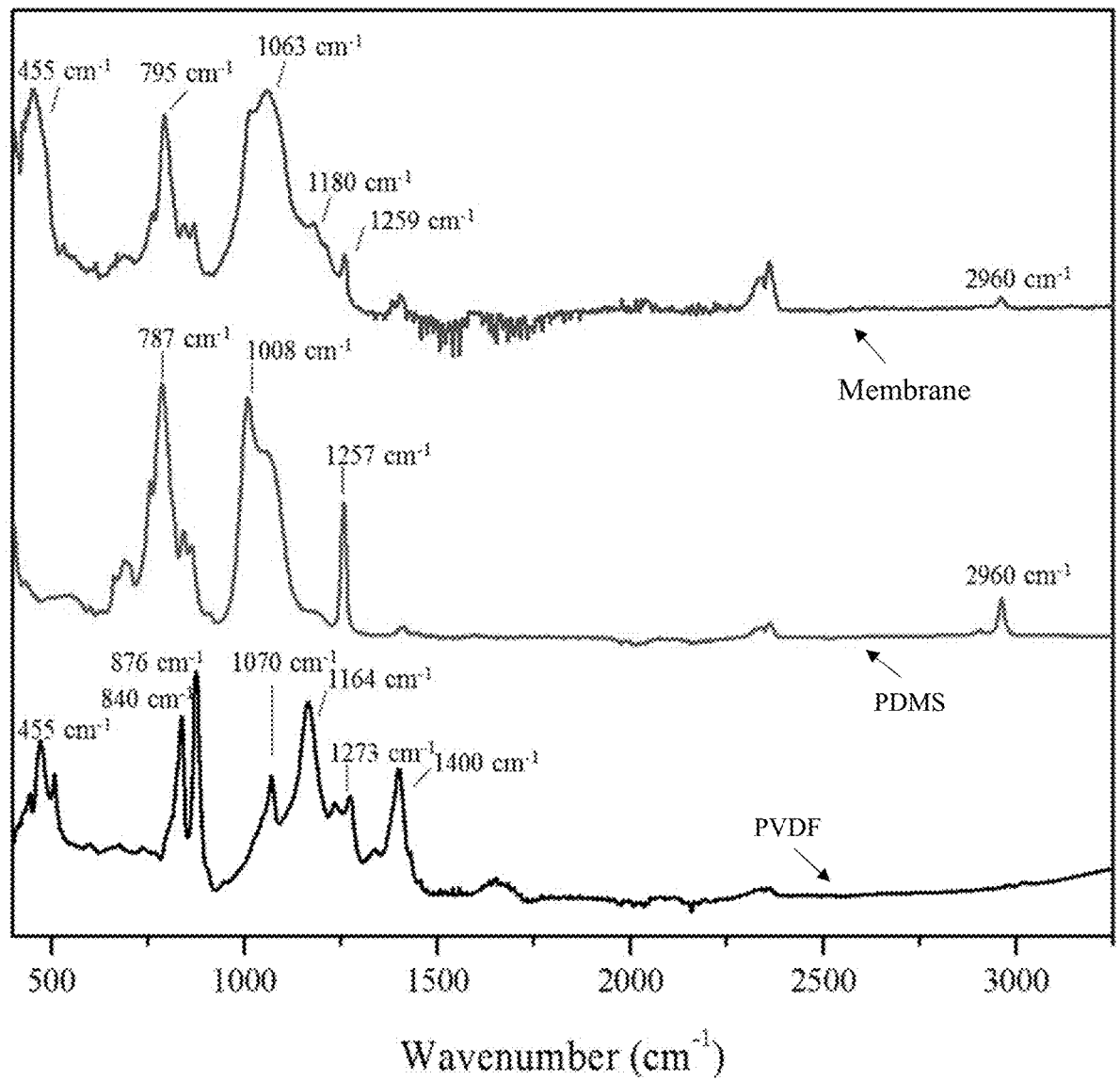
FIG. 6 shows, an infrared spectrum of the membrane (upper curve); an infrared spectrum of PDMS (mid curve); and an infrared spectrum of PVDF (lower curve).

The FTIR analysis of the membrane and its components, as shown in FIG. 6, accounts for the correct incorporation of all materials to the surface.

The immersion times of the mesh in the mixture were varied in the range between 30 and 60 seconds, obtaining in every case membranes with super-hydrophobicity properties, as determined by their contact angle.

The method of the examples above were modified by replacing $SiO_2$ nanoparticles with titanium dioxide ($TiO_2$) nanoparticles, obtaining in every case membranes with super-hydrophobic properties.

Figure 5A:
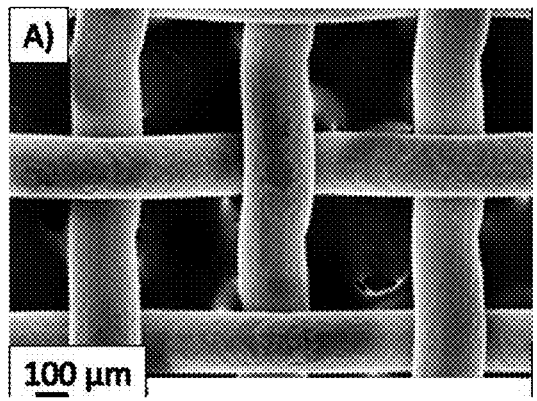
FIG. 5A shows a mesh before treatment with nanoparticulated oxides and hydrophobic polymers.
Figure 5B:
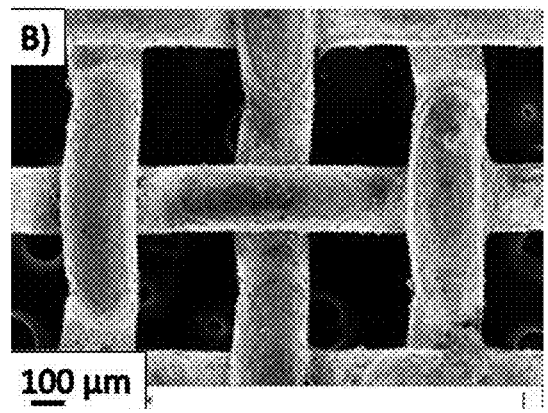
FIG. 5B shows the mesh after treatment.
Figure 5C:
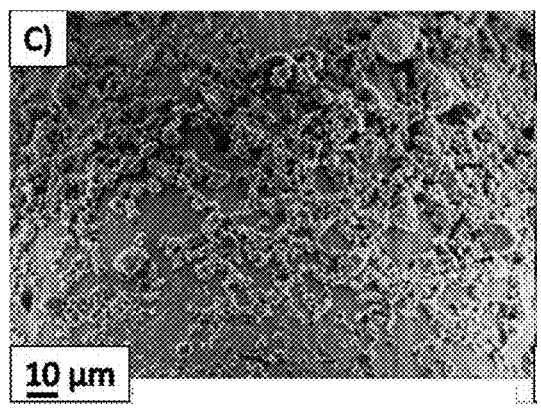
FIGS. 5C and 5D show magnifications of FIG. 5B where the nanostructure can be observed.
Figure 5D:
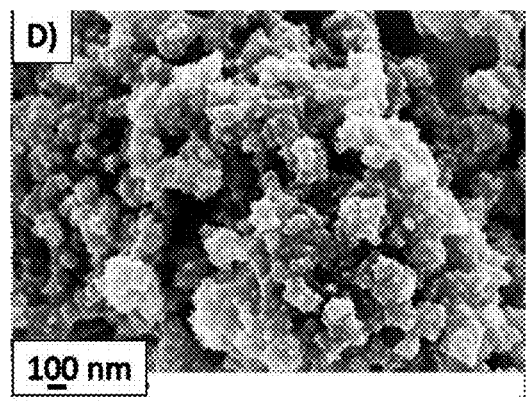

FIG. 5A shows SEM images of the metal mesh before treatment, FIG. 5B shows the metal mesh after treatment and FIGS. 5C-5D show magnifications of FIG. 5B where the nanostructuring of the surface is observed.

Figure 7A:
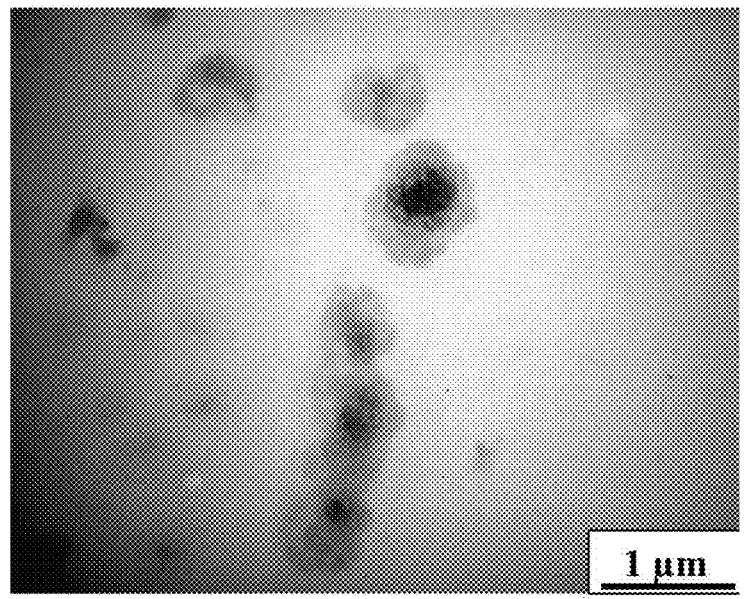
FIGS. 7A-7B show transmission electronic microscopy (TEM) images of the material composed of nanoparticulated oxides and polymers (PVDF/PDMS) that was mechanically removed from the metal mesh.
Figure 7B:
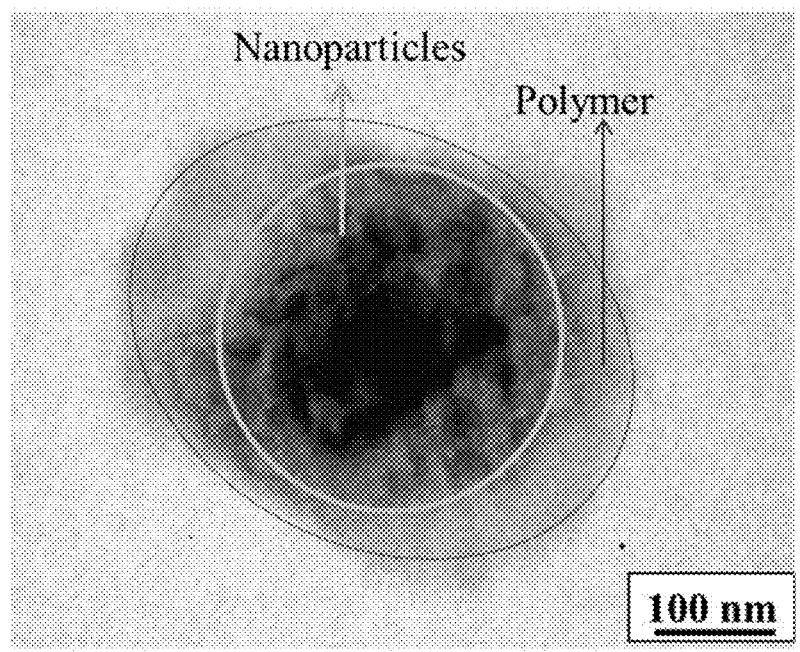

FIGS. 7A-7B show two TEM images of the material covering the membranes prepared using this method after mechanical removal thereof. An intimate contact between the polymer and the nanoparticulate oxides is observed, as a result of the high concentration of these materials in the initial mixture.

Figure 8:
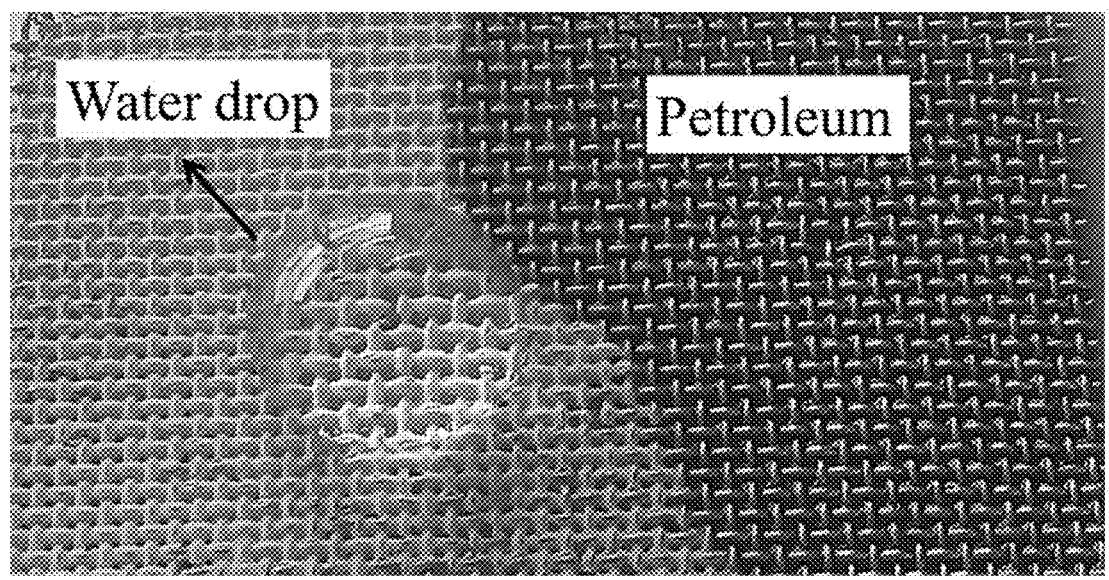
FIG. 8 shows a photograph showing the superhydrophobic/oleophilic behavior of the membrane with nanoparticulated oxides and polymers. A drop of water dyed with copper sulphate applied on the left-hand side. A drop of crude oil diluted in toluene applied on the right-hand side.

FIG. 8 shows the performance of the membrane prepared using this method against water and oil. A drop of water dyed with copper sulphate applied on the left-side of the figure. A drop of crude oil diluted in toluene applied on the right side of the figure.

The obtained mesh has resistance to hostile conditions, such as resistance to water comprising monovalent and divalent ions in concentrations higher than 2000 ppm, and it may be used in at least three separation cycles of an oil/water mixture, always observing the same contact angle thereafter.

Polyvinylidene fluoride (PVDF), fluorinated ethylene propylene (FEP) and polytetrafluoroethylene (PTFE) were used as fluorinated polymers, obtaining in every case membranes with super-hydrophobic properties, determined by their contact angle.

TABLE 1

Contact angle of the meshes obtained in the exemplary embodiments, determined with KSV CAM 200 Optical Contact Angle Meter.

| Example | 1 | 2 | 3 | 4 |
| --- | --- | --- | --- | --- |
| Contact Angle (°) | 162 | 158 | 158 | 158 |

It is also to be understood that the above description is intended to be illustrative and not restrictive. Many embodiments will be apparent to those of in the art upon reviewing the above description. The scope of the invention should, therefore, be determined not with reference to the above description, but should instead be determined with reference to the appended claims, along with the full scope of equivalents to which such claims are entitled. Those skilled in the art will recognize or will be able to ascertain using no more than routine experimentation, many equivalents to the specific embodiments of the invention described. Such equivalents are intended to be encompassed by the following claims.

The invention claimed is:

1. A method for preparing a super-hydrophobic membrane comprising the steps of:
   a) providing a metal mesh;
   b) cleaning the metal mesh by immersion in an organic solvent;
   c) subjecting the metal mesh cleaned in step b) to a surface modification treatment to increase its hydrophilicity, wherein said surface modification treatment comprises an electrochemical anodizing process in an aqueous NaOH solution, and wherein the metal mesh is then subjected to a treatment step with a suspension of nanoparticulated oxides comprising $SiO_2$;
   d) coating the metal mesh treated in step c) with a hydrophobic organic substance, wherein the metal mesh is coated by immersion in a solution of a hydrophobic silylated reagent, and wherein the hydrophobic organic substance is the hydrophobic silylated reagent;
   e) drying the metal mesh treated in step d) in order to obtain the super-hydrophobic membrane,
   wherein surface modification treatment with a suspension of nanoparticulated oxides comprising $SiO_2$ of step c) multiplies the number of hydroxyl groups capable of reacting with the hydrophobic silylated reagent in step d), and
   wherein the super-hydrophobic membrane obtained has a contact angle of 162°.

2. The method according to claim 1, wherein the metal mesh is a mesh of an alloy selected from the group comprising brass, bronze, tin bronze or stainless steel.

3. The method according to claim 1, wherein the hydrophobic silylated reagent is selected from the group comprising hexadecyltrimethoxysilane (HDTMS), octadecyltrimethoxysilane, and their respective ethoxylated derivates and silanols, in a mixture of ethanol and glacial acetic acid.

4. The method according to claim 1, wherein in step d) the mesh treated in step c) is dried at a temperature in the range between 90° C. and 210° C.

5. The method according to claim 4, wherein the temperature is 110° C.

6. The method according to claim 1, wherein in step d) the mesh treated in step c) is dried at a pressure in the range between 5 and 40 mmHg.

* * * * *